(12) United States Patent
Rodenberg

(10) Patent No.: US 9,178,342 B2
(45) Date of Patent: Nov. 3, 2015

(54) WIRE TROUGH

(75) Inventor: Lee Rodenberg, Evansville, IN (US)

(73) Assignee: Lee Rodenberg, Evansville, IN (US)

( * ) Notice: Subject to any disclaimer, the term of this patent is extended or adjusted under 35 U.S.C. 154(b) by 357 days.

(21) Appl. No.: 13/077,356

(22) Filed: Mar. 31, 2011

(65) Prior Publication Data

US 2012/0247804 A1  Oct. 4, 2012

(51) Int. Cl.
*H02G 3/04* (2006.01)
*H02G 3/08* (2006.01)
*H02G 3/20* (2006.01)
*H02G 3/18* (2006.01)
*H02B 1/20* (2006.01)
*B65D 6/28* (2006.01)
*B65D 43/24* (2006.01)

(52) U.S. Cl.
CPC .......... *H02G 3/0425* (2013.01); *H02G 3/0418* (2013.01)

(58) Field of Classification Search
CPC ............... F16L 57/00; F16L 3/00; F16L 3/26; H02G 3/04; H02G 3/0418; H02G 3/0425; H02G 3/0431; H02G 3/0608; H01R 25/14; H01R 25/145; B65D 85/04; B65D 85/045; B65D 43/24; B65D 8/053
USPC ............ 174/68.1, 68.3, 72 A, 488, 656, 663, 174/101, 491, 492; 248/68.1; 16/345; 413/2; 312/107.5, 328; D13/155; 138/159; 220/836, 324, 431, 561, 831; 206/372, 373, 751, 736; 361/827; 292/256.5
See application file for complete search history.

(56) References Cited

U.S. PATENT DOCUMENTS

| | | | | |
|---|---|---|---|---|
| 1,471,757 A | * | 10/1923 | Thiriot | 312/233 |
| 2,757,946 A | * | 8/1956 | Weig | 220/3.8 |
| 2,905,201 A | * | 9/1959 | McNaughton | 285/419 |
| 3,003,794 A | * | 10/1961 | Burley | 174/68.3 |
| 3,025,829 A | * | 3/1962 | Smith | 312/34.8 |
| 3,312,251 A | * | 4/1967 | Marks et al. | 174/68.3 |
| 4,266,835 A | * | 5/1981 | Schmidt | 312/244 |
| 4,398,564 A | * | 8/1983 | Young et al. | 174/68.3 |
| 4,406,379 A | * | 9/1983 | Anderson et al. | 16/356 |
| 5,062,605 A | * | 11/1991 | Muhlethaler | 248/68.1 |
| 5,624,029 A | * | 4/1997 | Shih | 206/372 |
| 5,951,129 A | * | 9/1999 | Stein | 312/249.13 |
| 6,012,683 A | * | 1/2000 | Howell | 174/68.3 |
| 6,700,060 B1 | | 3/2004 | Johnson | |
| 7,510,078 B2 | * | 3/2009 | Schmidt et al. | 206/372 |
| 7,525,044 B2 | | 4/2009 | Howell et al. | |
| 8,729,408 B2 | * | 5/2014 | Pawlak | 174/504 |
| 2007/0163797 A1 | * | 7/2007 | Caveney et al. | 174/68.1 |
| 2009/0200057 A1 | * | 8/2009 | Caveney et al. | 174/101 |

OTHER PUBLICATIONS

Bush-Evolution Cable Tray for 150CM Desk, csn/stores.co.uk, 2 pages.

(Continued)

*Primary Examiner* — Chau N Nguyen
*Assistant Examiner* — Roshn Varghese
(74) *Attorney, Agent, or Firm* — Barnes & Thornburg LLP

(57) ABSTRACT

A wire trough includes a body having back walls that engage the surfaces of a wall and a ceiling in a room. Side walls extend from the back walls to provide a horizontal and a vertical surface for stubbing in conduits. The trough also includes a cover that is used to permit access to an interior space in the wire trough. Multiple troughs may be assembled together to extend the length of the trough. Conduits may also be stubbed into the ends of the trough.

17 Claims, 6 Drawing Sheets

(56) References Cited

OTHER PUBLICATIONS

ATK Electric Supply; A Division of ATK Technologies, Inc., Wiegmann T2212CH, 2.5" x 2.5" x 12" NEMA 12 Hinged Wiring Trough, 1 page.
ElecDirect.com; Selection, Service & Quality Solutions, Corner Edge Duct, 3 page.
Sonix Cable Trough Wire Tray to Fix Sonix S2 1800mm Rectangular Desk, 2 page.

* cited by examiner

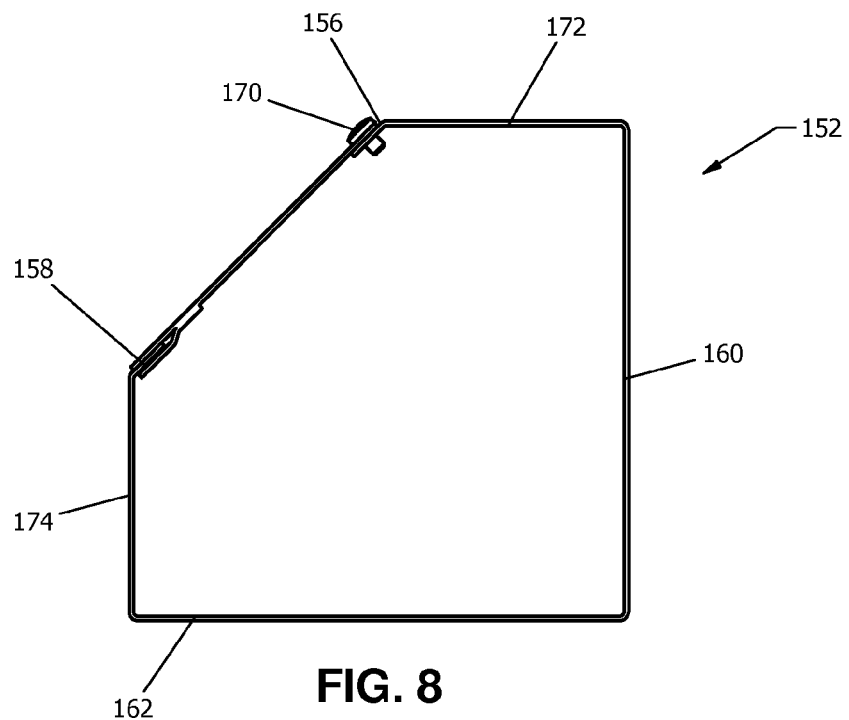
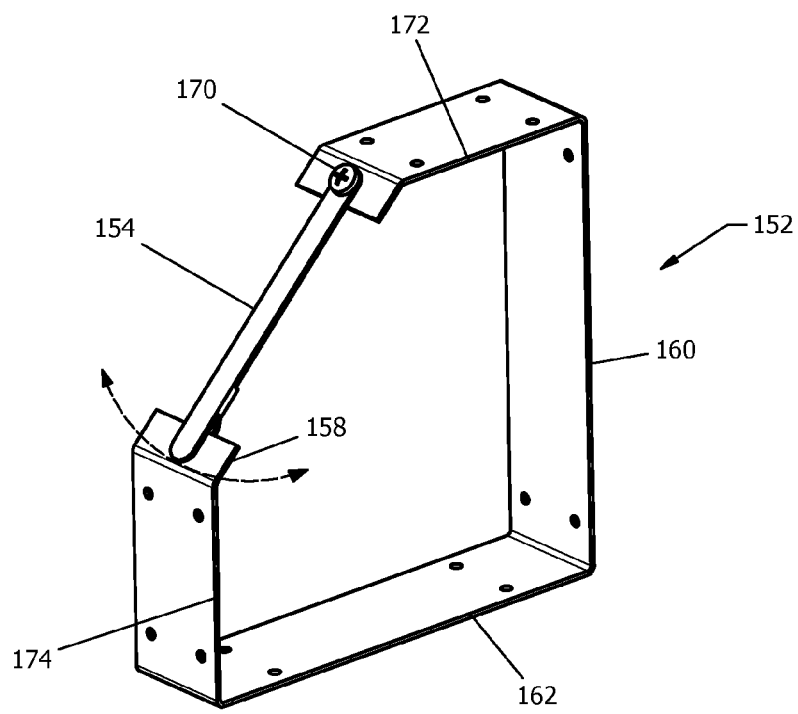

WIRE TROUGH

TECHNICAL FIELD

The present disclosure relates generally to wire troughs used to route power throughout a structure. More specifically, the present disclosure relates to wire troughs that permit conduits to be stubbed out of the wire trough.

BACKGROUND

Wire troughs are used in electrical construction to provide easy access to electrical distribution assemblies. A wire trough allows an electrician to stub a few conduits out of a power panel and into the trough. Smaller conduits may be run to install new fixtures, utilizing the circuits that have been stubbed into the trough, without entering the panel. In addition, the trough allows an electrician to route conduit from the trough, which acts as a junction box, without need for bending angles in metal conduit.

Some wire troughs may include covers that are removed to allow access to the interior space of the trough. Such covers, being removable, may not be penetrated with conduit as doing so would prevent the cover from being easily removed. This limits the directions in which conduit may be stubbed into or out of the typical wire trough, as conduits cannot be run perpendicularly to the cover.

SUMMARY

The present application discloses one or more of the features recited in the appended claims and/or the following features which alone or in any combination, may comprise patentable subject matter.

According to the present disclosure, a wire trough may be mountable to a structure including a wall and a ceiling. The wire trough may include a first body, a cover, and a plurality of end walls. The first body may include a plurality of back walls. Each back wall may define an outer planar surface. The outer planar surfaces of the back walls may be positioned at an angle to one another to form a first angle. The body may also include a first side wall coupled to a first one of the plurality of back walls. The first side wall may define a planar surface that is generally perpendicular to the outer planar surface of the first one of the plurality of back walls. The body may also include a second side wall spaced apart from the first side wall and coupled to a second one of the plurality of back walls. The second side wall may define a planar surface that is generally perpendicular to the outer planar surface of the second one of the plurality of back walls. The first and second side walls each may have an outer edge. The outer edges of the first and second side walls may be generally parallel and spaced apart. The cover may be coupleable to the body to extend from the outer edge of the first side wall to the outer edge of the second side wall. The plurality of end walls may be engaged with the back walls, side walls, and cover to form an enclosure defining an interior space.

The outer planar surfaces of the back walls may be positioned at an angle of about ninety degrees. The planar surfaces of the first and second side walls may be positioned at an angle of about ninety degrees.

The cover may be pivotably coupled to the body and movable between a position that allows access to the interior space and a position that encloses the interior space.

The wire trough may further include a latch operable to secure the cover in the position that encloses the interior space.

In some embodiments, at least one of the end walls may be removably secured to the body.

The trough may include a second body and a splice bracket. The first body may include a plurality of back walls. Each back wall may define an outer planar surface. The outer planar surfaces of the back walls may be positioned at an angle to one another to form a first angle. The body may also include a first side wall coupled to a first one of the plurality of back walls. The first side wall may define a planar surface that is generally perpendicular to the outer planar surface of the first one of the plurality of back walls. The body may also include a second side wall spaced apart from the first side wall and coupled to a second one of the plurality of back walls. The second side wall may define a planar surface that is generally perpendicular to the outer planar surface of the second one of the plurality of back walls. The first and second side walls each may have an outer edge. The outer edges of the first and second side walls may be generally parallel and spaced apart. The cover may be coupleable to the body to extend from the outer edge of the first side wall to the outer edge of the second side wall. The splice bracket may be positioned between the first and second bodies. The splice bracket may be removably secured to the first and second bodies to secure the first and second bodies together.

The splice bracket may include a plurality of back walls that engage with the back walls of the first and second bodies. The splice bracket may also include a first side wall that engages the first side walls of the first and second bodies. The splice bracket may still further include a second side wall that engages the second side walls of the first and second bodies.

In some embodiments, the splice bracket may include a cover support extending from the first side wall of the splice bracket to the second side wall of the splice bracket. The cover support may be pivotably coupled to one of the first and second side walls of the splice bracket. The cover support may be movable between a support position and an open position.

According to a second aspect of the present disclosure, a wire trough includes first and second back walls, a first side wall, a second side wall, at least one end wall, and a cover. The first side wall may extend from the first back wall. The first side wall may have an outer edge. The second side wall may extend from the second back wall. The second side wall may have an outer edge generally parallel to and spaced apart from the outer edge of the first side wall. The at least one end wall may be coupled to the first and second back walls and the first and second side walls. The cover may extend from the first side wall to the second side wall to enclose the trough.

The cover may be removably coupled to the first and second side wall. In some embodiments, the cover may be pivotably coupled to one of the side walls and movable between an open position and a closed position.

The trough may further include a latch to secure the cover in the closed position.

The end wall may be removably secured to the first and second back walls and first and second side walls.

According to another aspect of the present disclosure, an assembly includes a first wire trough and a second wire trough and a spice plate. The first wire trough may include first and second back walls, and a cover. A first side wall may extend from the first back wall and may have an outer edge. The second side wall may extend from the second back wall and may have an outer edge generally parallel to and spaced apart from the outer edge of the first side wall. The cover may extend the first side wall to the second side wall to enclose the trough. The second wire trough may include first and second back walls, and a cover. A first side wall may extend from the first back wall and may have an outer edge. The second side wall may extend from the second back wall and may have an outer edge generally parallel to and spaced apart from the outer edge of the first side wall. The cover may extend the first side wall to the second side wall to enclose the trough. The splice bracket may be interposed between the first and second wire troughs to secure the first and second wire troughs and splice bracket together as an assembly.

At least one of the first and second wire troughs may further include at least one end wall coupled to the first and second back walls and the first and second side walls of the at least one of the first and second wire troughs.

The splice bracket may include a plurality of back walls that engage with the back walls of the first and second wire troughs. The splice bracket may also include a first side wall that engages the first side walls of the first and second wire troughs. The splice bracket may still further include a second side wall that engages the second side walls of the first and second wire troughs.

In some embodiments, the splice bracket includes a cover support extending from the first side wall of the splice bracket to the second side wall of the splice bracket. The cover support may be pivotably coupled to one of the first and second side walls of the splice bracket. The cover support may be movable between a support position and an open position.

Additional features and advantages of the invention will become apparent to those skilled in the art upon consideration of the following detailed description of illustrated embodiments exemplifying the best mode of carrying out the invention as presently perceived.

BRIEF DESCRIPTION OF THE DRAWINGS

The detailed description of the drawings particularly refers to the accompanying Figs. in which:

FIG. 8 is a side view of a splice bracket usable with the wire trough embodiment of FIG. 7 to splice multiple trough bodies together to form a trough assembly; and FIG. 9 is a perspective view of the splice bracket of FIG. 8.

DETAILED DESCRIPTION OF THE DRAWINGS

Figure 1:
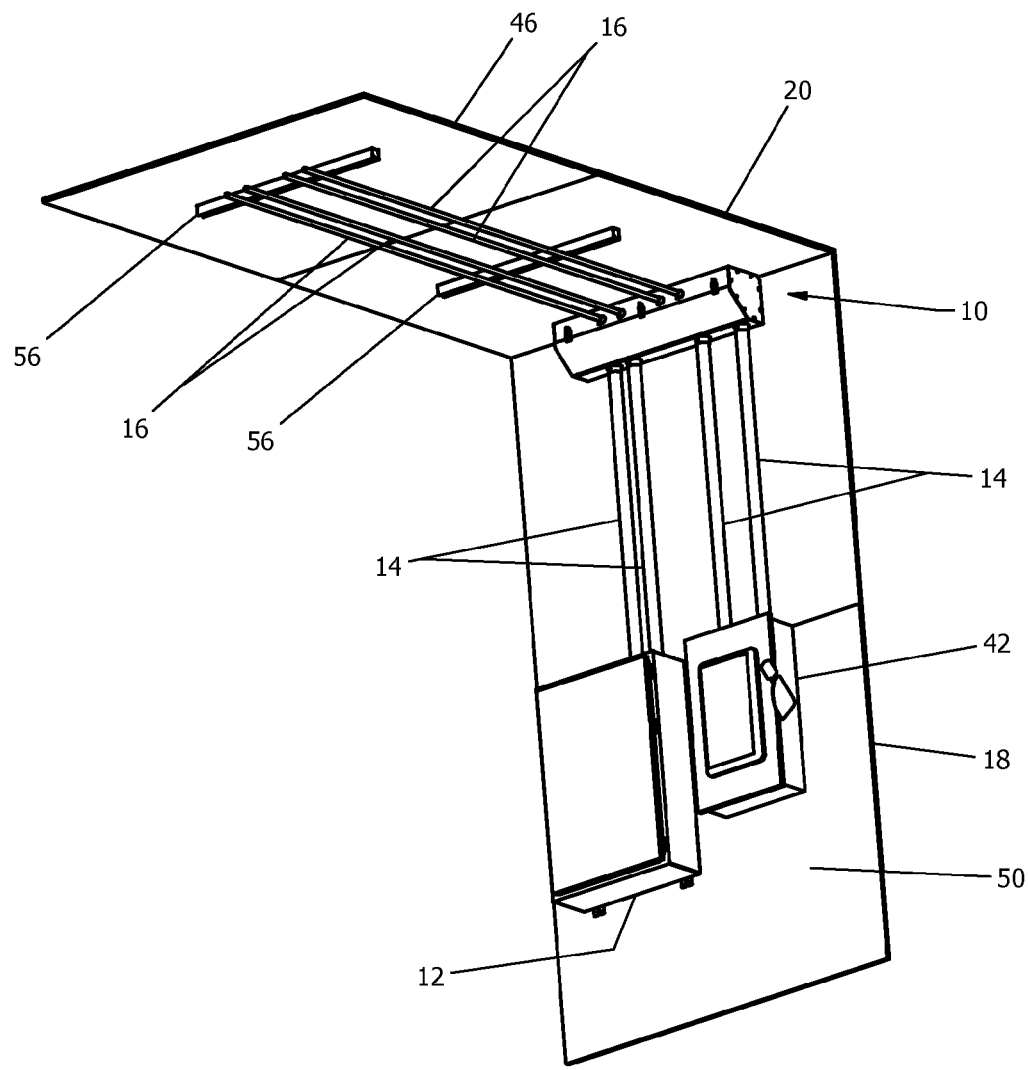
FIG. 1 is a perspective view of a first embodiment of a wire trough positioned at the intersection of a ceiling and a wall, the wire trough having multiple surfaces through which conduits may be stubbed from a panel and fixtures mounted on a ceiling.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 2:
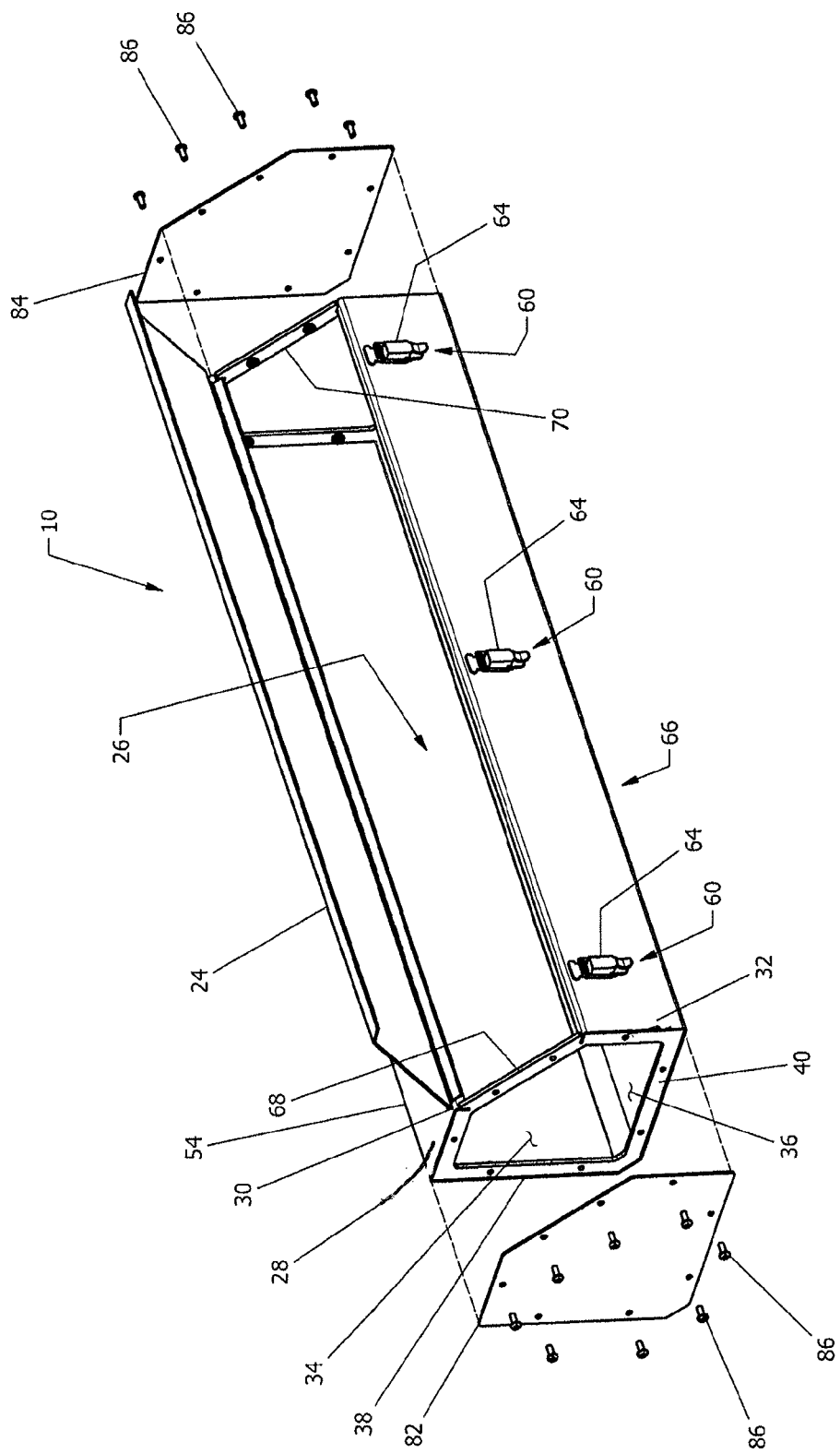
FIG. 2 is a perspective exploded assembly view of the embodiment of the wire trough shown in FIG. 1.
Figure 6:
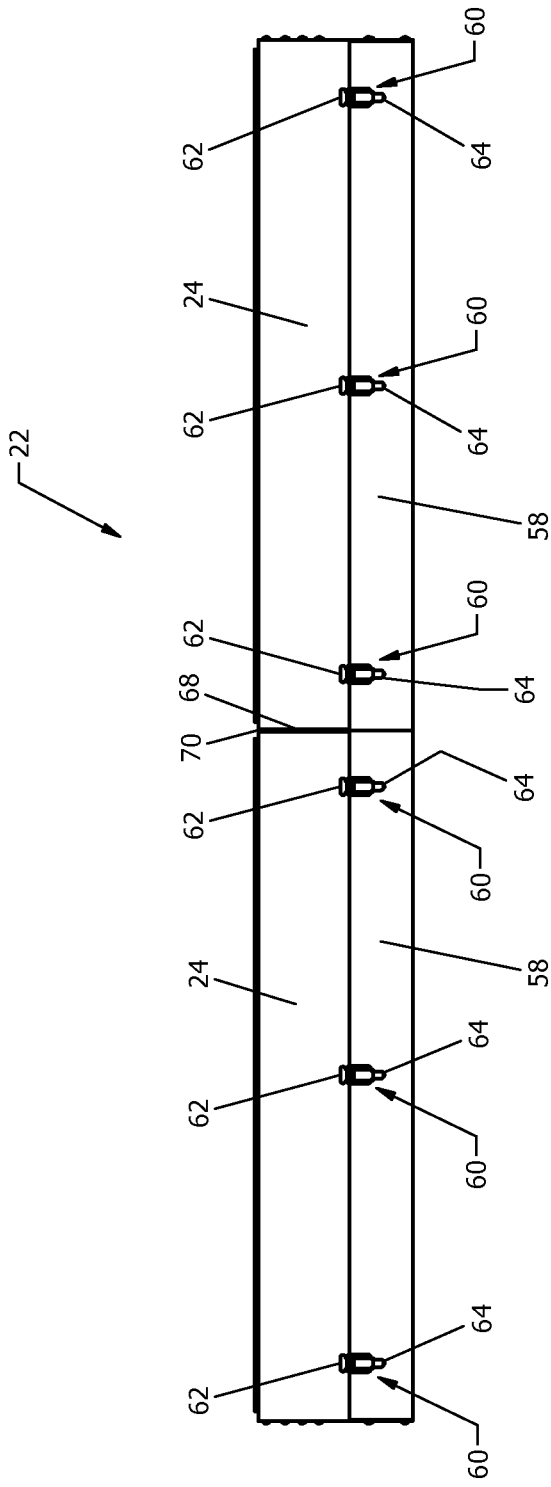
FIG. 6 is a front view of two troughs positioned adjacent one another to form a trough assembly.

Referring now to FIG. 1, a wire trough 10 is configured to enclose and support wires that are routed from a panel 12 or disconnect 42 into the trough 10 through one or more vertical conduits 14 as shown in FIG. 1. The wire trough 10 is also configured to engage one or more horizontal conduits 16. As shown in FIG. 1, the wire trough 10 is positioned against a wall 18 and a ceiling 20 to support electrical wires positioned in the trough 10. As will be discussed in further detail below, the wire trough 10 may be configured to be spliced to adjacent wire troughs 10 to form a wire trough assembly 22 as shown in FIG. 6. The trough 10 includes a cover 24 that is opened or removed to expose an interior space 26 of the trough 10. In the illustrative embodiment of FIG. 2, the cover is supported from a side wall 28 of the trough 10 by a hinge 30 which allows the cover 24 to be moved between a closed position as shown in FIG. 1 and an open position as shown in FIG. 2.

In use, the wire trough 10 allows a user to route new wire circuits through the trough 10 and vertical conduits 14 or horizontal conduits 16 while the electrical power to the panel 12 or disconnect 42 is live. Upon wiring of a new fixture and routing of the associated wiring through the conduits 14, 16, a user may then de-energize the panel 12 and add the new circuit to the panel 12. This permits an electrician to perform a major task associated with the adding of additional circuits supplied from the panel 12 without having to access the panel 12 during the entire process, thus limiting the amount of time power must be de-energized from the panel 12. Alternatively, the user may splice or otherwise connect the new wire circuits to existing wires routed from the panel 12 in the trough 10 thereby eliminating the necessity of accessing the panel 12.

The wire trough 10 includes another side wall 32 and two back walls 34 and 36. The back walls 34 and 36 have generally planar outer surfaces 38 and 40 respectively. The outer surfaces 38 and 40 are positioned at an angle 44 of about ninety degrees. The trough 10 is configured to be mounted with the outer surface 38 of back wall 34 in contact with a surface 46 of a ceiling 20. The outer surface 40 of the back wall 36 contacts a surface 50 of a wall 18 so that the trough 10 is positioned in contact with both the ceiling 20 and wall 18 when the trough 10 is mounted. The side wall 28 has an outer surface 54 positioned generally perpendicular to the outer surface 38 of the back wall 34 and, thereby, generally perpendicular to the surface 46 of the ceiling 20 when the trough 10 is installed. The horizontal conduits 16 are mounted to the ceiling 20 by struts 56 so that the conduits 16 may intersect the side wall 28 with the conduits 16 generally perpendicular to the outer surface 54.

Similarly, the side wall 32 includes a generally planar outer surface 58 that is oriented generally perpendicular to the outer surface 40 of the back wall 36 and the surface 50 of the wall 52. The conduits 14 extend from the panel 12 or the disconnect 42 and intersect the side wall 32 with the conduits 14 generally perpendicular to the outer surface 40 of the side wall 32. The side wall 28 and side wall 32 each extend outwardly from the back walls 34 and 36 respectively, but do not intersect. The side walls 28 and 32 and the back walls 34 and 36 cooperate to define a body 66 of the trough 10.

The cover 24 is pivotably secured to the side wall 28 through the hinge 30 which is mounted on the side wall 28. When moved to a closed position as shown in FIG. 1, the cover 24 is secured to the side wall 32 by a number of locks 60, each of which has a first part 62 secured to cover 24 and a second part 64 that is secured to the side wall 32. In the illustrative embodiments, the second part 64 is embodied as a draw latch that engages the first part 62 which is embodied as a catch. The draw latch 64 is engageable with the catch 62 and movable to a locked position securing the catch 62 to the draw latch 64. Utilizing the locks 60, the cover 24 may be releasably secured in the closed position. It should be understood that a number of other methods may be used to secure the cover 24 in a closed position. For example, the cover 24 may be secured to the side walls 28 and 32 by a number of fasteners that are removable such that the cover 24 is removable from the side walls 28 and 32 to provide access to the interior space 26 of the trough 10. Additionally, it should be appreciated that in other embodiments, the cover 24 may be hinged to the side wall 32 rather than the side wall 28. In such embodiments, the second part 64 of the locks 60 are secured to the side wall 28.

Figure 3:
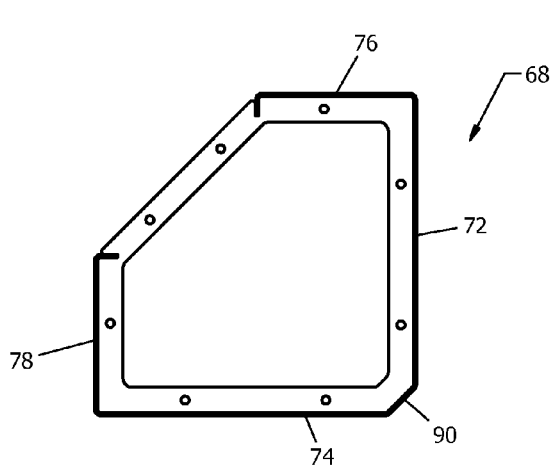
FIG. 3 is an end view of an end bracket of the wire trough of FIG. 2.
Figure 4:
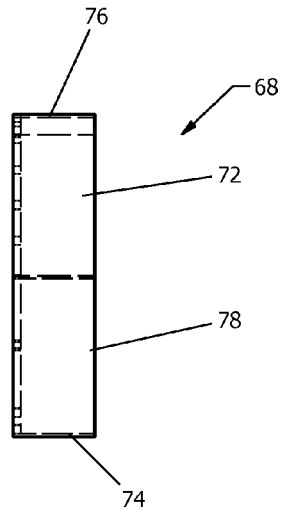
FIG. 4 is a side view of the end bracket of FIG. 3.
Figure 5:
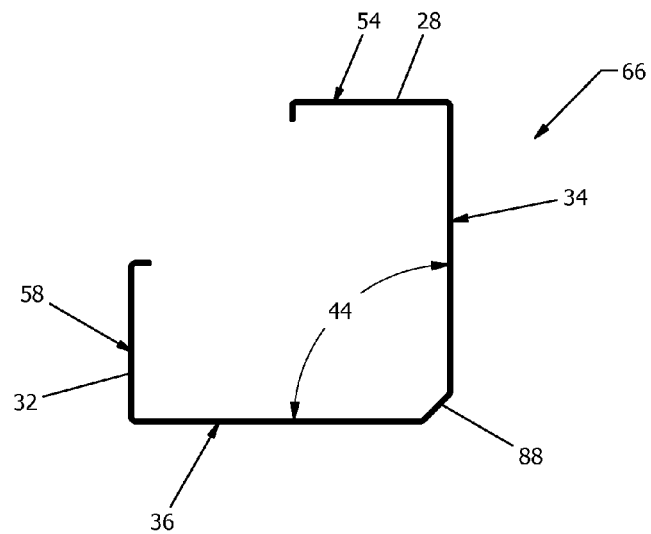
FIG. 5 is a side view of a body of the wire trough of FIG. 2.

The wire trough 10 also includes two end brackets 68 and 70 which are secured to the body 66. In the illustrative embodiment of FIGS. 1-5, the end brackets 68 and 70 are secured to the body 66 by welding. The end brackets 68 and 70 are mirror images of each other, an the end bracket 68 being shown in FIGS. 2 and 3 as representative of both brackets 68 and 70. The end bracket 68 includes two back walls 72 and 74 that engage the back walls 34 and 36 of the body 66, respectively. The end bracket 68 also includes two side walls 76 and 78 that engage the side walls 28 and 32, respectively, of the body 66. The bracket 68 also includes a cover support 80 that spans from the side wall 76 to the side wall 78 and provides support for the cover 24 when the cover 24 is in the closed position.

The wire trough 10 includes end walls 82 and 84 that are secured to the respective end brackets 68 and 70 by a number of fasteners 86 to enclose the trough 10. The end walls 82 and 84 are removable to allow a user to access the interior space 26 from either end of the trough 10. The end walls 82 and 84 may also have conduits routed through the end walls 82 and 84 to extend service through horizontal conduit that engages either of the end walls 82 and 84 and extends outwardly therefrom.

As can be seen in FIGS. 2-5, the back walls 34 and 36 of the body 66 and the back walls 72 and 74 of the end bracket 68 are connected by a respective relief wall 88 and 90. The relief walls 88 and 90 allow the trough 10 to fit against the ceiling 20 and wall 52 with relief for any inconsistencies in the joint between the ceiling 20 and wall 52.

In some cases, the length of the trough 10 may be insufficient for a particular application. In such embodiments, multiple wire troughs 10 may be assembled together to form a trough assembly 22 as shown in FIG. 6. The trough assembly 22 is formed by omitting an end wall 82 of one trough 10 and an end wall 84 of an adjacent trough 10. An end bracket 68 of the first trough 10 is secured to an end bracket 70 of a second trough 10 utilizing fasteners (not shown) such that the end brackets 68 and 70 abut and the trough 10 is assembled. The end brackets 68 and 70 each serve as a splice bracket, permitting the two troughs 10, 10 to be spliced together to form a single trough assembly.

Figure 7:
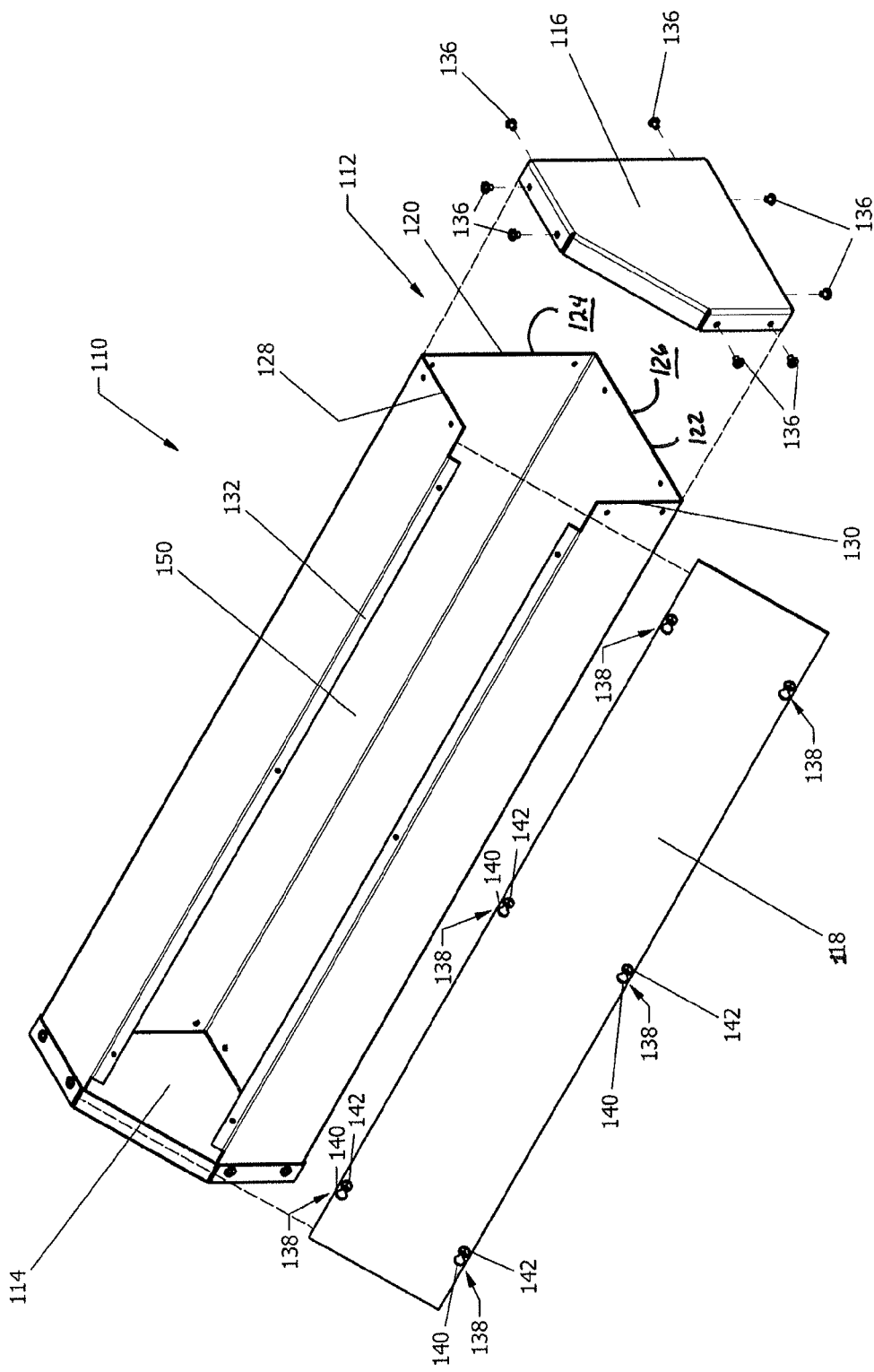
FIG. 7 is an exploded assembly view of another embodiment of a wire trough.

Referring now to FIG. 7, in another embodiment, a wire trough 110, which is similar to trough 10, includes a body 112, two ends 114 and 116, and a cover 118 as shown in FIG. 7. The body 112 includes back walls 120 and 122 that are positioned perpendicular to each other with respective outer surfaces 124 and 126. The body 112 further includes side walls 128 and 130 that extend from the respective back walls 120 and 122. The body also includes two flanges 132 and 134 formed on the respective side walls 128 and 130 and extending therefrom such that the flanges 132 and 134 are generally coplanar. The flange 132 extends away from the side wall 128 at an obtuse angle relative to the side wall 128. Likewise, the flange 134 extends away from the side wall 130 at an obtuse angle relative to the side wall 130.

The cover 118 engages with the flanges 132 and 134 and is secured to the body 112 by a number of fasteners 136. The cover 118 is formed to include a number of keyhole shaped openings 138 that have a first part 140 that is larger than the heads of the fasteners 136 and a second part 142 that is a slot that is smaller than the diameter of the heads of the fasteners 136 but smaller than a shaft (not shown) of the fasteners 136. The cover 118 is positioned over the fasteners 136 and slid longitudinally into position. When in position, the fasteners 136 are tightened to secure the cover 118 to the body 112. In this way, the cover 118 can be removed from the body 112 without completely removing the fasteners 136.

The ends 114 and 116 are secured to the body 112 by a number of fasteners 136. The cover 118 and ends 114 and 116 are thereby each removably coupled to the body 112 to permit access to an interior space 150 of the trough 110. The trough 110 is positioned in a structure with the outer surface 124 of back wall 120 engaging a ceiling and the outer surface 126 of the back wall 122 engaging a wall of the structure. Conduits may be stubbed into either of the side walls 128 and 130 or through the ends 114 and 116.

A splice bracket 152, shown in FIGS. 8 and 9, may be used to secure a first body 112 to a second body 112 to extend the length of a trough 110. In the illustrative embodiment of FIGS. 7-9, an end 114 is omitted from one trough 110 and an end 116 of an adjacent trough 110 is also omitted. The splice bracket 152 is inserted into the adjacent bodies 112, 112 and secured into place with fasteners 136. The adjacent bodies 112, 112 are positioned in an abutting relationship. In some embodiments, the covers 118, 118 of the two troughs 110 may be omitted and replaced by a single cover (not shown) that extends the length of the two bodies 112, 112. In such embodiments, the elongated cover is supported by a cover support 154 that is rotatably coupled to a flange 156 of the splice bracket 152 by fastener 170. In the illustrative embodiment, the fastener 170 is embodied as a rivet. When electrical wiring is to be placed in the trough assembly, the cover support 154 may be rotated relative to the flange 156 to create an opening between the flange 156 and another flange 158 so that the wiring may be laid into the trough assembly without having to feed the wiring under the cover support 154. The splice bracket 152 includes two back walls 160, 162 that engage the respective back walls 120 and 122 and two side walls 172 and 174 respective side walls 128 and 130 of the adjacent bodies 112.

The fasteners 86 of the illustrative embodiment of FIGS. 1-5 are thread forming screws that pass through holes formed in the end walls 82 and 84 and engage holes in the end brackets 68 and 70 to secure the end walls 82 and 84 to the end brackets 68 and 70. The fasteners 136 of the illustrative embodiment of FIGS. 6-8 are thread forming screws that pass through holes in the ends 114, 116 and cover 118 to engage holes in the body 112 and secure the ends 114, 116 or cover 118 to the body 112. Similarly, fasteners 136 may pass through the body 112 and engage holes formed in the splice bracket 154 to secure the splice bracket 152 to the respective bodies 112. It should be understood that other fasteners may be used within the scope of this disclosure. For example, machine screws may be used in conjunction with threaded nuts to secure the various components together.

The wire troughs 10 and 110 may be secured to the wall 18 and/or ceiling 20 using conventional fastening systems as known to those of ordinary skill in the art. The conduits 14 and 16 may be secured to the troughs 10 and 110 using any suitable method and mechanisms. For example, in some embodiments, the various walls of the wire troughs 10 and 110 may be embossed to include knockouts to ease the assembly of the conduits 14 and 16 to the troughs 10 and 110. Additionally or alternatively, openings for engaging the conduits 14 and 16 may be mechanically created by an electrician in the field.

The troughs 10 and 110 and the various components used to construct the troughs 10 and 110, may comprise any of a number of materials including various metals and plastics within the scope of this disclosure. In addition, seals may be employed at various joints between the structures such that the troughs 10 and 110 meet various codes and standards that might be applicable to their use in certain applications.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure and the appended claims are desired to be protected.

The invention claimed is:

1. A wire trough mountable to a structure including a plurality of walls and a ceiling, the wire trough comprising:
   a first body including (i) a plurality of back walls, the plurality of back walls coupled together by a relief wall, each back wall defining an outer planar surface, the outer planar surfaces positioned at an angle to one another to form a first angle and at an obtuse angle to an outer planar surface defined by the relief wall, (ii) a first side wall coupled to a first one of the plurality of back walls, the first side wall terminating at the first one of the back walls, the first side wall defining a planar surface that is generally perpendicular to the outer planar surface of the first one of the plurality of back walls, (iii) a first planar flange coupled to the first side wall, the first flange extending away from the first side wall at a first obtuse angle relative to the first side wall, (iv) a second side wall spaced apart from the first side wall and coupled to a second one of the plurality of back walls, the second side wall terminating at the second one of the back walls, the second side wall defining a planar surface that is generally perpendicular to the outer planar surface of the second one of the plurality of back walls, the first and second side walls each having an outer edge, the outer edges of the first and second side walls being generally parallel and spaced apart, and (v) a second planar flange coupled to the second side wall, the second flange extending away from the second side wall at a second obtuse angle relative to the second side wall, the second flange coplanar with the first flange,
   a cover coupleable to the first body so as to engage with and extend from the outer edge of the first side wall to engage the outer edge of the second side wall and the first and second flanges,
   a plurality of end walls, the end walls engaged with the back walls, side walls, and cover to form an enclosure defining an interior space, and
   a coupler engaging at least one of the plurality of end walls to removably secure the entire end wall to the first body.

2. The wire trough of claim 1, wherein the outer planar surfaces of the back walls are positioned at an angle of about ninety degrees.

3. The wire trough of claim 2, wherein the planar surfaces of the first and second side walls are positioned at an angle of about ninety degrees.

4. The wire trough of claim 1, wherein the cover is pivotably coupled to the first body and movable between a position that allows access to the interior space and a position that encloses the interior space.

5. The wire trough of claim 4, wherein the wire trough further comprises a latch operable to secure the cover in the position that encloses the interior space.

6. The wire trough of claim 1, further comprising
   a second body including a plurality of back walls, each back wall defining an outer planar surface, the outer planar surfaces positioned at an angle to one another to form a first angle, a first side wall coupled to a first one of the plurality of back walls, the first side wall defining a planar surface that is generally perpendicular to the outer planar surface of the first one of the plurality of back walls, a second side wall spaced apart from the first side wall and coupled to a second one of the plurality of back walls, the second side wall defining a planar surface that is generally perpendicular to the outer planar surface of the second one of the plurality of back walls, the first and second side walls each having an outer edge, the outer edges of the first and second side walls being generally parallel and spaced apart, the first and second bodies positioned such that the back walls and first and second side walls are generally aligned, and
   a splice bracket positioned between the first and second bodies, the splice bracket removably secured to the first and second bodies to secure the first and second bodies together.

7. The wire trough of claim 6, wherein the splice bracket comprises a plurality of back walls that engage with the back walls of the first and second bodies, a first side wall that engages the first side walls of the first and second bodies, and a second side wall that engages the second side walls of the first and second bodies.

8. The wire trough of claim 7, wherein the splice bracket includes a cover support extending from the first side wall of the splice bracket to the second side wall of the splice bracket.

9. The wire trough of claim 8, wherein the cover support is pivotably coupled to one of the first and second side walls of the splice bracket, the cover support movable between a support position and an open position.

10. A wire trough comprising
    first and second back walls, the first and second back walls coupled to one another by a relief wall separate from each of the first and second back walls,
    a first side wall extending from the first back wall and having an outer edge, the first side wall terminating at the first back wall,
    a first planar flange coupled to the first side wall, the first flange extending away from the first side wall at a first obtuse angle relative to the first side wall,
    a second side wall extending from the second back wall and having an outer edge generally parallel to and spaced apart from the outer edge of the first side wall, the second side wall terminating at the second back wall,
    a second planar flange coupled to the second side wall, the second flange extending away from the second side wall at a second obtuse angle relative to the second side wall, the second flange coplanar with the first flange, at least one end wall coupled to the first and second back walls and the first and second side walls, a cover engaging with and extending from the outer edge of the first side wall to engage with the outer edge of the second side wall and the first and second flanges to enclose the trough, and a coupler engaging the at least one end wall to removably secure the entire end wall to the first and second back walls and the first and second side walls.

11. The wire trough of claim 10, wherein the cover is removably coupled to the first and second side wall.

12. The wire trough of claim 10, wherein the cover is pivotably coupled to one of the side walls and movable between an open position and a closed position.

13. The wire trough of claim 12, wherein the trough further comprises a latch to secure the cover in the closed position.

14. An assembly comprising:

a first wire trough including first and second back walls, the first and second back walls coupled to one another by a relief wall extending at an obtuse angle to each of the first and second back walls, a first side wall extending from the first back wall and having an outer edge, the first side wall terminating at the first back wall, a first planar flange coupled to the first side wall, the first flange extending away from the first side wall at a first obtuse angle relative to the first side wall, a second side wall extending from the second back wall and having an outer edge generally parallel to and spaced apart from the outer edge of the first side wall, the second side wall terminating at the second back wall, a second planar flange coupled to the second side wall, the second flange extending away from the second side wall at a second obtuse angle relative to the second side wall, the second flange coplanar with the first flange, and a cover engaging with and extending from the outer edge of the first side wall to engage the outer edge of the second side wall and the first and second flanges to enclose the trough;

a second wire trough including first and second back walls, a first side wall extending from the first back wall and having an outer edge, a second side wall extending from the second back wall and having an outer edge generally parallel to and spaced apart from the outer edge of the first side wall, and a cover engaging with and extending from the outer edge of the first side wall to the outer edge of the second side wall to enclose the trough;

a splice bracket interposed between the first and second wire troughs to secure the first and second wire troughs and splice bracket together as an assembly, wherein at least one of the first and second wire troughs further comprises at least one end wall coupled to the first and second back walls and the first and second side walls of the at least one of the first and second wire troughs.

15. The assembly of claim 14, wherein the splice bracket comprises a plurality of back walls that engage with the back walls of the first and second wire troughs, a first side wall that engages the first side walls of the first and second wire troughs, and a second side wall that engages the second side walls of the first and second wire troughs.

16. The assembly of claim 15, wherein the splice bracket includes a cover support extending from the first side wall of the splice bracket to the second side wall of the splice bracket.

17. The assembly of claim 16, wherein the cover support is pivotably coupled to one of the first and second side walls of the splice bracket, the cover support movable between a support position and an open position.

\* \* \* \* \*